(12) United States Patent
Jung et al.

(10) Patent No.: US 8,194,177 B2
(45) Date of Patent: Jun. 5, 2012

(54) DIGITAL IMAGE PROCESSING APPARATUS AND METHOD TO PHOTOGRAPH AN IMAGE WITH SUBJECT EYES OPEN

(75) Inventors: Jae-hyo Jung, Changwon (KR); Hyun-seok Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 12/369,074

(22) Filed: Feb. 11, 2009

(65) Prior Publication Data

US 2009/0201389 A1 Aug. 13, 2009

(30) Foreign Application Priority Data

Feb. 11, 2008 (KR) ........................ 10-2008-0012202

(51) Int. Cl.
*H04N 5/235* (2006.01)
*H04N 5/222* (2006.01)
*H04N 5/217* (2011.01)

(52) U.S. Cl. ..................... 348/362; 348/333.03; 348/241

(58) Field of Classification Search ............... 348/222.1, 348/231.99, 231.2, 241, 333.03, 362, 367
See application file for complete search history.

(56) References Cited

U.S. PATENT DOCUMENTS

| | | | | |
|---|---|---|---|---|
| 7,038,715 B1 * | 5/2006 | Flinchbaugh | ............ | 348/207.99 |
| 7,084,918 B2 * | 8/2006 | Robins et al. | ............ | 348/333.03 |
| 7,146,026 B2 * | 12/2006 | Russon et al. | ................ | 382/117 |
| 7,659,923 B1 * | 2/2010 | Johnson | ....................... | 348/218.1 |
| 7,852,356 B2 * | 12/2010 | Takikawa et al. | ............. | 345/660 |
| 2004/0207743 A1 * | 10/2004 | Nozaki et al. | ............. | 348/333.12 |
| 2005/0024516 A1 * | 2/2005 | Fish et al. | ................ | 348/333.03 |
| 2006/0034602 A1 * | 2/2006 | Fukui | ............................ | 396/263 |
| 2008/0101659 A1 * | 5/2008 | Hammoud et al. | ........... | 382/118 |
| 2008/0117310 A1 * | 5/2008 | Kaneda et al. | ............. | 348/231.2 |
| 2008/0252745 A1 * | 10/2008 | Nakamura | ................ | 348/222.1 |
| 2009/0059021 A1 * | 3/2009 | Rimon et al. | ............. | 348/222.1 |
| 2010/0039527 A1 * | 2/2010 | Kretz et al. | ................ | 348/222.1 |

* cited by examiner

*Primary Examiner* — John Villecco

(74) *Attorney, Agent, or Firm* — Drinker Biddle & Reath LLP

(57) ABSTRACT

Provided are a digital image processing apparatus and a method of controlling the same. The digital image processing apparatus includes a digital signal processing unit that recognizes a facial expression of a face from a photographed image, determines whether the eyes of the subject's face are closed, and re-photographs the image when the eyes are closed. The method of controlling the digital image processing apparatus includes: (a) receiving an image; (b) generating a photographed image by photographing the image; (c) checking whether the eyes on a face photographed on the photographed image are closed; and (d) generating a re-photographed image by re-photographing the image when the eyes are closed.

19 Claims, 3 Drawing Sheets

DIGITAL IMAGE PROCESSING APPARATUS AND METHOD TO PHOTOGRAPH AN IMAGE WITH SUBJECT EYES OPEN

CROSS-REFERENCE TO RELATED PATENT APPLICATION

This application claims the benefit of Korean Patent Application No. 10-2008-0012202, filed on Feb. 11, 2008 in the Korean Intellectual Property Office, the disclosure of which is incorporated herein in its entirety by reference.

BACKGROUND OF THE INVENTION

1. Field of the Invention

The present invention relates to a digital image processing apparatus and a method of controlling the same, and more particularly, to a digital image processing apparatus capable of taking another picture when the eyes of a person in a photographed image are closed, and a method of controlling the digital image processing apparatus.

2. Description of the Related Art

A digital image processing apparatus refers to all kinds of devices that include a motion recognition sensor and can process digital images, such as a personal digital assistant (PDA), a phone camera, a PC camera, etc. The digital image processing apparatus receives a desired image through an image capture device and displays the received image on an image display device, stores the image as an image file according to a selection of the user, and instructs a printing device to print the stored image file.

Recently, digital image processing apparatuses having a face recognition function have been released on the market. When a face is included in a preview image, the digital image processing apparatuses having a face recognition function can recognize the face and thus take a clear image of the face by focusing thereon.

SUMMARY OF THE INVENTION

The present invention provides a digital image processing apparatus capable of taking another picture when the eyes of a person in a photographed image are closed, and a method of controlling the digital image processing apparatus.

According to an aspect of the present invention, there is provided a digital image processing apparatus comprising a digital signal processing unit that recognizes the facial expression of a face in a photographed image, determines whether the subject's eyes are closed, and re-photographs the image if the eyes are closed.

The digital signal processing unit may comprise: a facial expression detecting unit detecting a facial expression on the face in the photographed image; a facial expression determination unit determining whether the subject's eyes are shut; and a re-photographing unit generating a re-photographed image by re-photographing an object when it is determined that the eyes are shut.

The facial expression detecting unit may detect the facial expression on the face in the re-photographed image, and the facial expression determination unit determines whether the eyes in the re-photographed image are closed.

According to another aspect of the present invention, there is provided a method of controlling a digital image processing apparatus, the method comprising: (a) receiving an image; (b) generating a photographed image by photographing the image; (c) checking whether the eyes on a face in the photographed image are shut; and (d) generating a re-photographed image by re-photographing the image when the eyes are shut.

Step (c) may comprise: detecting a facial expression in the photographed image; and determining whether the eyes in the detected facial expression are shut.

The received image may be automatically re-photographed in step (d).

After step (d), the method may further comprise determining whether the eyes of the person in the re-photographed image are shut.

The method may further comprise re-photographing the received image when the eyes in the re-photographed image are shut.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
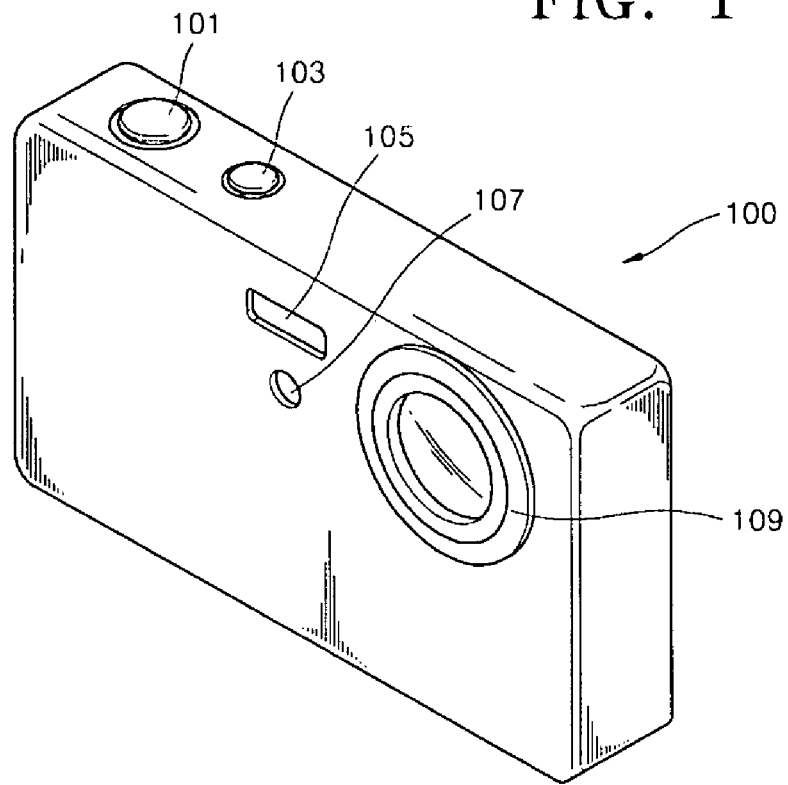
FIG. 1 is a front perspective view illustrating a digital image processing apparatus according to an embodiment of the present invention.

The present invention will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the invention to those skilled in the art. Like reference numerals denote like elements throughout the specification.

Figure 2:
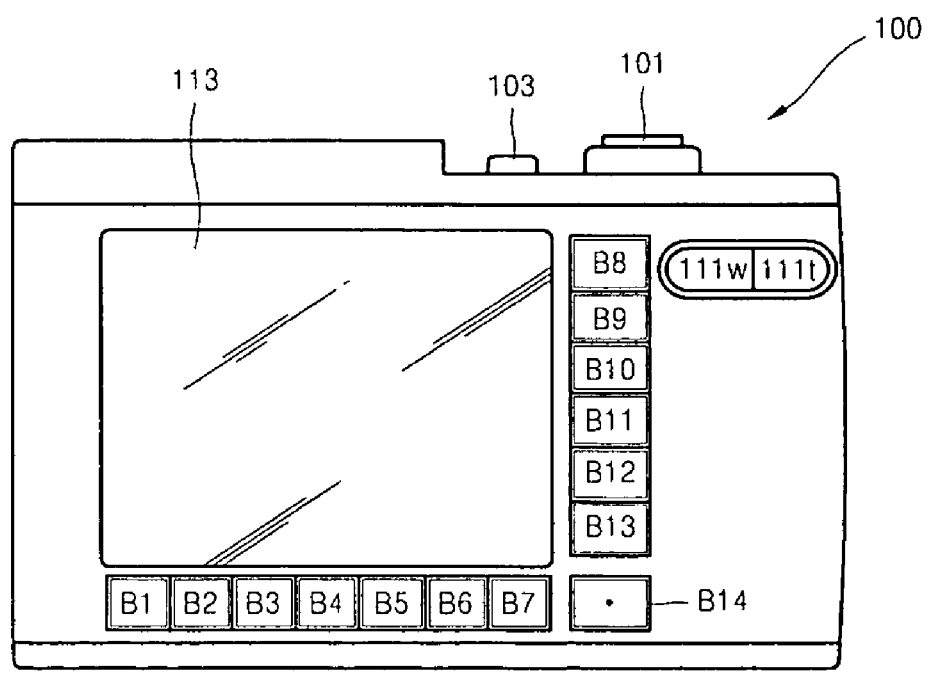
FIG. 2 is a rear view of the digital image processing apparatus of FIG. 1, according to an embodiment of the present invention.

FIG. 1 is a front perspective view of a digital image processing apparatus 100 according to an embodiment of the present invention. FIG. 2 is a rear view of the digital image processing apparatus 100 of FIG. 1.

Referring to FIGS. 1 and 2, the digital image processing apparatus 100 includes a shutter-release button 101, a power button 103, a flash unit 105, an auxiliary light unit 107, a lens unit 109, a wide angle-zoom button 111w, a telephoto-zoom button 111t, a display unit 113, and input buttons B1 through B14.

The shutter-release button 101 is pressed to open or shut an aperture (not shown) and a shutter (not shown) to expose a charge coupled device (CCD) or a complementary metal-oxide-semiconductor (CMOS) to light for a predetermined period of time.

The shutter-release button 101 is pressed by a user to generate first and second shutter-release signals. If the first shutter-release signal is input by half pressing the shutter-release button 101, the digital image processing apparatus 100 performs focusing and adjusts the aperture, i.e., the amount of light. When correct focus is achieved, a green light is turned on in the display unit 113. After the first shutter-release signal is input and the correct focus is obtained, and the amount of light is adjusted, a second shutter-release signal is input by fully pressing the shutter-release button 101 in order to capture an image.

The power button 103 is pressed to supply power to the digital image processing apparatus 100 to operate the same.

The flash 105 provides a brief pulse of light when an image is photographed in a dark environment. The flash modes include an auto-flash mode, a forced flash mode, a flash-off mode, a red-eye reduction mode, and a slow-sync flash mode.

The auxiliary light unit 107 supplies light to an object so that the digital image processing apparatus 100 can perform auto-focusing quickly and accurately when the object lacks illumination or when the photographing is performed at night.

The lens unit 109 receives light from an external light source and forms an image on the image sensor.

When the wide angle-zoom button 111w or the telephoto-zoom button 111t is pressed, an angle of view is widened or narrowed. In particular, the wide angle-zoom button 111w or the telephoto-zoom button 111t is pressed to change a selected exposure area. When the wide angle-zoom button 111w is pressed, the selected exposure area is reduced, and when the telephoto-zoom button 111t is pressed, the selected exposure area is expanded.

The input buttons B1 through B14 are vertically and horizontally arranged adjacent to the display unit 113. Each of the input buttons B1 through B14 that are vertically and horizontally arranged adjacent to the display unit 113 includes a touch sensor (not shown) or a contact switch (not shown).

When a touch sensor is included in each of the input buttons B1 through B14, items such as color or brightness among main menu items may be selected, or a sub menu icon included in a main menu icon may be selected by scrolling through the menus in an appropriate direction of the buttons B1 through B7 or B8 through B14, and then by selecting a desired item by pressing a corresponding button of the buttons B1 through B7 or B8 through B14.

Also, when a contact switch is included in each of the buttons B1 through B14, the main-menu icon and the sub-menu icon may be directly selected to activate corresponding functions. A touch sensor does not require a strong touch like the pressure required for a contact switch.

Figure 3:
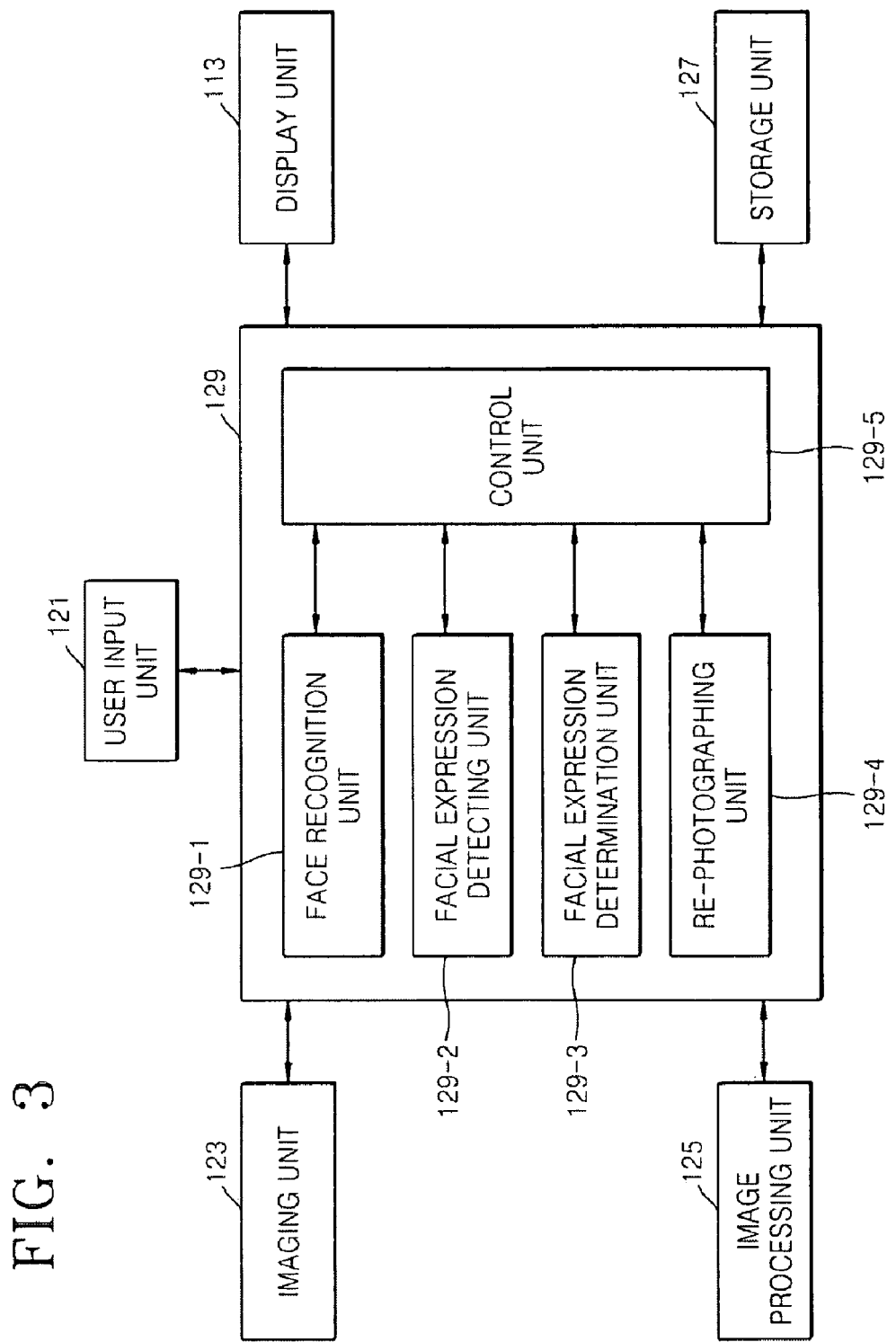
FIG. 3 is a block diagram illustrating the digital image processing apparatus of FIG. 1, according to an embodiment of the present invention.

FIG. 3 is a block diagram of a digital image processing apparatus according to an embodiment of the present invention. Referring to FIG. 3, the digital image processing apparatus includes a display unit 113, a user input unit 121, an imaging unit 123, an image processing unit 125, a storage unit 127, and a digital signal processing unit 129.

The user input unit 121 may include a shutter-release button 101 which is pressed to expose an image sensor such as a CCD or a CMOS to light for a predetermined period of time, a power button 103 that is pressed to supply power, a wide angle-zoom button 111w and a telephoto-zoom button 111t widening or narrowing an angle of view, and the user input unit 121 to input characters and to select menus.

The imaging unit 123 includes a lens unit 109, a shutter (not shown), an aperture (not shown), an image sensor (not shown), and an analogue-to-digital converter (ADC). The shutter and the aperture work together to adjust the exposure amount of light. The lens unit 109 receives light from an external light source and allows an image to be formed on the image sensor. The aperture adjusts the amount of incident light according to the size of the aperture. The size of the aperture is controlled by the digital signal processing unit 129.

The image sensor collects the amount of light input through the lens unit 109, and outputs the image taken via the lens unit 109 and corresponding to the collected amount of light in response to a vertical sync signal. The digital image processing apparatus 100 captures an image using the image sensor which converts light from an object into an electrical signal. In order to acquire a color image using a CCD image sensor, a color filter is needed. Examples of the image sensor used in the digital image processing unit 100 are a CMOS image sensor and a CCD image sensor. A color filter array (CFA, not shown) is generally used. A CFA is an array of color filters regularly placed over the image sensor, and each pixel of the CFA transmits light of only one color. The CFA may have various arrangements. The ADC converts an analogue image signal output from the CCD image sensor into a digital image signal.

The image processing unit 125 processes the converted digital image signal so as to be displayable. Components used in the CCD image sensor and CFA filter are sensitive to a temperature change and generate a dark current according to the changed temperature that is included in an undesired black level. The image processing unit 125 may remove the black level caused by the dark current.

Also, the image processing unit 125 may perform a gamma correction. Since the human eyes responds non-linearly to brightness according to Weber's law, when a limited bit depth is given and the brightness of light is linearly recorded, posterization is generated. Accordingly, in order to display the greatest image quality under a given bit depth, information needs to be encoded using a non-linear function, and encoding information based on the non-linear eyesight of people is referred to as gamma correction. In gamma correction performed by the image processing unit 125, image signals input according to a gamma curve are gamma-corrected and output; for example, an image signal having an input brightness level of a 12 bit signal can be corrected to a brightness level of 8 bit and output.

The image processing unit 125 also performs CFA interpolation that interpolates a missing color in a Bayer pattern comprised of RGRG lines and GBGB lines of the gamma-corrected information into RGB lines to complete an RGB signal. In the CFA interpolation of the image processing unit 125, a G channel is first restored among pixels in which only R or B channel values are present, and then a B channel and an R channel or vice versa are restored, thereby filling empty values to restore the three R, G, and B channels.

The image processing unit 125 converts the RGB signal into a YUV signal, performs edge compensation that filters a Y signal using a high pass filter and obtains a clear image, and color correction that corrects color values of U and V signals using standard color coordinates, and reshifts noise of the Y, U, and V signals.

The image processing unit 125 compresses and processes the Y, U, and V signals whose noise is removed to generate an exchangeable image file format (Exif) file, and the generated Exif file is displayed on the display unit 113 and stored in the storage unit 127. All of the operations of the image processing unit 125 are conducted under the control of the digital signal processing unit 129.

The digital signal processing unit 129 may recognize a facial expression of a face in a photographed image, judges whether the eyes of the subject are shut, and rephotographs if the eyes are shut. To this end, the digital signal processing unit 129 includes a face recognition unit 129-1, a facial expression detecting unit 129-2, a facial expression determination unit 129-3, a re-photographing unit 129-4, and a control unit 129-5.

The face recognition unit 129-1 may detect at least one piece of face information from an input image, that is, the size of the face, position and direction of the face, and so forth. When detecting the size of the face, the face recognition unit 129-1 may detect a face region based on colors or edges. Also, when detecting the position of the face, the face recognition unit 129-1 may calculate the position of the face using a distance between an extracted center of the face and the previously set center of the display unit 113. When detecting the direction of the face, the face recognition unit 129-1 may detect the direction of the face from the triangle shape consisting of the eyes and the mouth of the extracted face. Since the face information detection of the face recognition unit 129-1 is well known in the art, detailed description thereof will be omitted.

The face position detected by the face recognition unit 129-1 is stored in the control unit 129-5, and the control unit 129-5 may move a cursor to a portion of the recognized face using the stored position information when direction keys, that is, the input buttons B1 through B14, are pressed through the user input unit 121.

The facial expression detecting unit 129-2 may detect the facial expression of a face from a photographed image under the control of the control unit 129-5. The input image received through the imaging unit 123 is photographed as the shutter-release button 101 is pressed. When the photographed image includes a person, the facial expression detecting unit 129-2 detects the facial expression of the face of the person. The facial expression detecting unit 129-2 may detect eye portions of the face region of the photographed person. In order to detect the eye portions, the facial expression detecting unit 129-2 detects position information of characteristic points of the eye portions. Also, the facial expression detecting unit 129-2 may detect the position of the pupils of the eyes to detect the eye portions.

Under the control of the control unit 1 29-5, the facial expression determination unit 129-3 determines whether the eyes detected by the facial expression detecting unit 129-2 are shut. Whether the eyes are shut can be determination from the photographed image based on the position information of the characteristic points of the eyes detected by the facial expression detecting unit 129-2. In other words, when the eyes are open, the positions of upper and lower eyelashes are separated from each other. Thus whether the eyes are shut can be determined by comparing the position information of the upper and lower eyelashes when the eyes are open to the position information of the upper and lower eyelashes detected from the photographed image. Also, whether the eyes are shut can be determined by comparing the contrast ratio of the pupil portions. That is, whether the eyes are shut can be determined by measuring the ratios of black pupil portions and white eye portions.

The re-photographing unit 129-4 may re-photograph an object when the eyes of the photographed image are determined to be shut by the facial expression determination unit 129-3 to generate a re-photographed image. When the photographed image includes more than one person, and at least one person has their eyes shut, the re-photographing unit 129-4 automatically re-photographs the image. The facial expression determination unit 129-3 determines whether the eyes of the photographed person are shut, and when the eyes are determined to be shut, the re-photographing unit 129-4 re-photographs an object automatically. Thus, the inconvenience to the user of having to check the photographed image and re-photograph can be avoided.

Whether the eyes are shut can also be checked in the re-photographed image. That is, the facial expression detecting unit 129-2 may detect a facial expression from the re-photographed image as well, and the facial expression determination unit 129-3 may determine whether or not eyes are shut in the above-described manner. When the eyes are also shut in the re-photographed image, the object can be automatically photographed again by the re-photographing unit 129-4.

Next, a method of controlling a digital image processing apparatus according to an embodiment of the present invention will be described in detail with reference to FIG. 4. The digital image processing method may be performed by the digital signal processing unit 129 of the image processing apparatus illustrated in FIG. 2 in conjunction with other elements therein.

Figure 4:
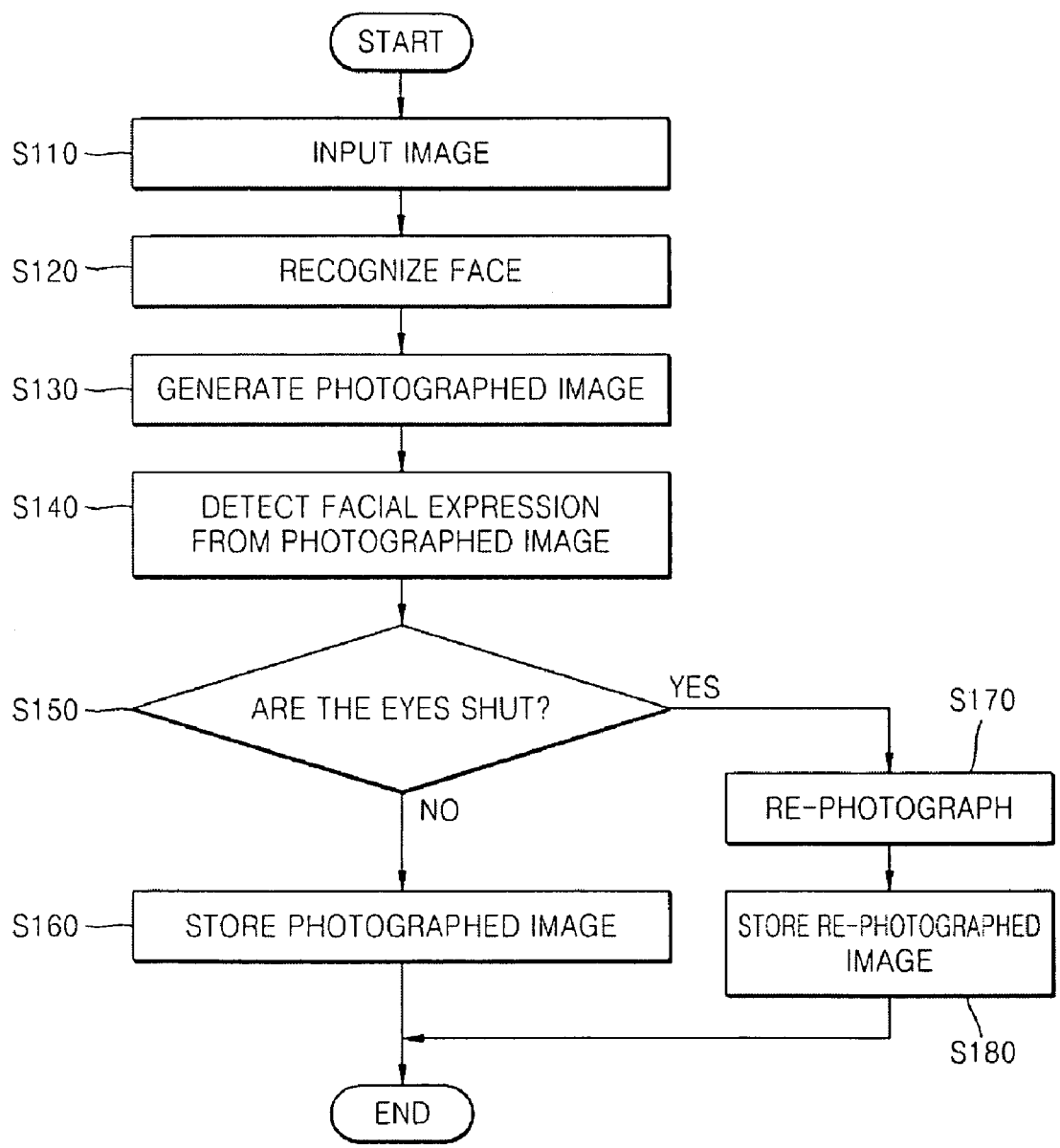
FIG. 4 is a flowchart illustrating a method of controlling the digital image processing apparatus, according to an embodiment of the present invention.

Referring to FIG. 4, a method of controlling the digital image processing apparatus according to the present invention includes: receiving an image in operation S110; recognizing a face from the received image in operation S120; generating a photographed image by photographing the received image in operation S130; checking whether the eyes of a person in the photographed image are shut in operations S140 and S1 50; and when the eyes are shut, generating a re-photographing image by re-photographing the received image in operations S170 and S180.

First, an image is received by the imaging unit 123 under the control of the digital signal processing unit 129 in operation S110.

Next, a face is recognized from the received image by the face recognition unit 129-1 in operation S120. The face recognition unit 129-1 may detect at least one piece of face information from the received image, such as the size of the face, the position and direction of the face, etc. When detecting the size of the face, the face recognition unit 129-1 may detect the face region based on colors or edges. Also, when detecting the position of the face, the face recognition unit 129-1 may calculate the position of the face by a distance between a center portion of the extracted face and a center of the display unit 113 that is set in advance. When detecting the direction of the face, the face recognition unit 129-1 may be detected from a triangle shape formed by the eyes and the mouth of the extracted face. Since detection of face information using the face recognition unit 129-1 is well known in the art, detailed description thereof will be omitted.

Next, the received image is photographed to generate a photographed image in operation S130. A shutter-release input signal is generated when the user presses the shutter-release button 101, and the shutter-release input signal is transmitted to the digital signal processing unit 1 29, the received image is photographed by the imaging unit 123, and the image processing unit 125 under the control of the digital signal processing unit 129, thereby generating a photographed image.

Next, a facial expression is detected from the photographed image in operation S140. When the photographed image includes a person, the facial expression detecting unit 129-2 may detect the facial expression of the person by detecting the portions around the eyes or the mouth. In order to detect the eyes, the facial expression detecting unit 129-2 detects characteristic points of the eye portions or position information on the outlines of the eyes. Also, the facial expression detecting unit 129-2 searches the position of the eye pupils to detect the eye portions. In detail, the eye portions can be detected by detecting the ratio of the surface area of the pupils and the irises to the total surface area of the eyes along the outline of the eyes.

Next, the facial expression determination unit 129-3 determines whether the eyes are shut from the detected facial expression in operation S150. Whether the eyes in the photographed image are shut can be determined by comparing the position information of the characteristic points of the eyes detected by the facial expression detecting unit 1 29-2 or the position information of the outlines of the eyes. In other words, when the eyes are open, the positions of the upper and lower eyelashes are separated from each other, and thus whether the eyes are shut can be determined by comparing the position information of the upper and lower eyelashes in the case when the eyes are open to the position information of the eyelashes detected in the photographed image. Also, whether the eyes are shut can be determined by comparing the contrast ratio of the pupils of the eyes. That is, whether the eyes are shut can be determined by measuring the ratios of black eye pupil portions and white portions of the eyes.

When the eyes in the photographed image are determined to be open, the photographed image is stored in the storage unit 127 in operation S160. The digital signal processing unit 129 controls the image processing unit 125 to generate the photographed image as a JPEG image file, and displays it on the display unit 113 and stores it in the storage unit 127.

When the eyes included in the photographed image are determined to be shut, the re-photographing unit 129-4 re-photographs the received image, thereby generating a re-photographed image in operation S170. In the re-photographed image, it is determined again whether the eyes of a person photographed are shut or not using the facial expression determination unit 129-3; and when the eyes are determined to be shut, the object is re-photographed automatically by the re-photographing unit 129-4. Thus, user inconvenience wherein the user has to check the photographed image and re-photograph by can be avoided.

Finally, the re-photographed image is stored in the storage unit 127 by the digital signal processing unit 129 in operation S180. The digital signal processing unit 129 controls the image processing unit 125 to generate the re-photographed image as a JPEG image file, and displays it on the display unit 113 and stores it in the storage unit 127.

According to another embodiment of the present invention, the re-photographing image can also be judged with respect to whether the eyes are shut. That is, the facial expression judging unit 129-2 may detect the facial expression of the re-photographing image as well, and the facial expression judging unit 129-3 may judge whether the eyes of the face are shut in the above-described manner. When the eyes in the re-photographing image are shut, the object may be automatically re-photographed by the re-photographing unit 129-4.

According to the digital image processing apparatus and the method of controlling the same according to the present invention, in a photographed image, it is determined whether the eyes of a photographed person are shut or not, and when the eyes are determined to be shut, the object can be automatically photographed again.

While the present invention has been particularly shown and described with reference to exemplary embodiments thereof, it will be understood by those of ordinary skill in the art that various replacements and changes in form and details may be made therein without departing from the spirit and scope of the present invention as defined by the following claims.

What is claimed is:

1. A digital image processing apparatus comprising a digital signal processing unit that recognizes a facial expression of a face of a subject from a photographed image, determines whether eyes on the face are closed by determining whether an upper set of eyelashes is separated from a lower set of eyelashes, and re-photographs the subject if the eyes are determined to be closed.

2. The digital image processing apparatus of claim 1, wherein the digital signal processing unit comprises:
   a facial expression detecting unit that detects the facial expression of the face from the photographed image;
   a facial expression determination unit that determines whether the eyes on the face are closed by determining whether the upper set of eyelashes is separated from the lower set of eyelashes; and
   a re-photographing unit that generates a re-photographed image by re-photographing the subject if it is determined that the eyes are closed.

3. The digital image processing apparatus of claim 2, wherein the facial expression detecting unit detects a re-photographed facial expression of a re-photographed face in the re-photographed image, and the facial expression determination unit determines whether re-photographed eyes in the re-photographed image are closed.

4. A method of controlling a digital image processing apparatus, the method comprising:
   (a) receiving an image;
   (b) generating a photographed image by photographing the image;
   (c) checking whether an eye on the face in the photographed image is closed by determining whether an upper eyelash is separated from a lower eyelash; and
   (d) generating a re-photographed image by re-photographing the image if the checking determines that the eye is closed.

5. The method of claim 4, wherein checking whether the eye on the face in the photographed image is closed comprises:
   detecting a facial expression from the photographed image; and
   determining whether the eye in the detected facial expression is closed.

6. The method of claim 5, further comprising measuring a ratio of a black pupil portion to a white portion of the eye.

7. The method of claim 4, wherein the image is automatically re-photographed when the eye is closed.

8. The method of claim 4, further comprising determining whether an eye in the re-photographed image is closed.

9. The method of claim 8, further comprising re-photographing the image a second time when the eye in the re-photographed image is closed.

10. A method of controlling a digital image processing apparatus, the method comprising:
    receiving a first image;
    detecting a subject's face in the first image by recognizing a facial expression;
    generating a second image if in the first image an upper set of eyelashes is separated from a lower set of eyelashes on the subject;
    determining whether the upper set of eyelashes is separated from the lower set of eyelashes in the second image; and
    generating a third image if it is determined that at least one set of eyelashes is not separated in the second image.

11. The method of claim 10, wherein the second image is generated automatically.

12. The method of claim 10, wherein at least a portion of the facial expression is detected based on a size of the face.

13. The method of claim 12, wherein the size of the face is detected based on color.

14. The method of claim 12, wherein the size of the face is detected based on edges.

15. The method of claim 10, wherein at least a portion of the facial expression is detected based on a position and direction of the face.

16. The method of claim 15, wherein the position of the face is detected by calculating a distance between a center portion of the face and a center of a display on the digital image processing apparatus.

17. The method of claim 16, wherein the direction of the face is detected from a triangle shape formed by a mouth and first and second eyes of the subject.

18. The method of claim 10, further comprising storing the second image in a memory.

19. A digital image processing apparatus comprising a digital signal processing unit that recognizes a facial expression of a face of a subject from a photographed image, determines whether an eye on the face is closed by determining whether an upper eyelash of the subject is not separated from a lower eyelash of the subject, and automatically re-photographs the subject if the eye is determined to be closed.

* * * * *